United States Patent [19]

Ikeda et al.

[11] 4,165,464
[45] Aug. 21, 1979

[54] LIGHT SCANNING SYSTEM

[75] Inventors: Hiroyuki Ikeda, Yokohama; Moritoshi Ando, Tokyo; Takefumi Inagaki, Kawasaki, all of Japan

[73] Assignee: Fujitsu Limited, Japan

[21] Appl. No.: 692,350

[22] Filed: Jun. 3, 1976

[30] Foreign Application Priority Data

Jun. 10, 1975 [JP] Japan .................................. 50/70378

[51] Int. Cl.² .......................................... G02B 21/38
[52] U.S. Cl. ................................. 250/550; 350/3.71; 350/6.2; 350/162 ZP; 358/205
[58] Field of Search .................. 350/162 ZP, 3.5, 285, 350/6–7; 178/7.6; 356/200; 358/205; 250/550

[56] References Cited

U.S. PATENT DOCUMENTS

| | | | |
|---|---|---|---|
| 2,006,124 | 6/1935 | Baird | 358/205 |
| 3,277,772 | 10/1966 | Atwood | 358/205 |
| 3,457,422 | 7/1969 | Rottmann | 350/6 |
| 3,588,517 | 6/1971 | Maxwell et al. | 358/205 |
| 3,614,193 | 10/1971 | Beister | 350/7 |
| 3,619,033 | 11/1971 | McMahon | 350/7 |
| 3,973,825 | 8/1976 | Starkweather | 350/6 |

FOREIGN PATENT DOCUMENTS 443393  2/1936  United Kingdom .................... 358/205

*Primary Examiner*—John K. Corbin
*Assistant Examiner*—B. W. de los Reyes
*Attorney, Agent, or Firm*—Staas & Halsey

[57] ABSTRACT

A light scanning system is described, comprising a circular disk having a plurality of zone-type lenses, where each of the zone-type lenses converges an incoming light beam toward a corresponding focal point, and when moving said circular disk and said incoming light beam relatively each other, said focal point scans object to be scanned in a scanning direction.

27 Claims, 25 Drawing Figures

LIGHT SCANNING SYSTEM

The present invention relates to a light scanning apparatus which scans an object by using a converged light beam.

The light scanning apparatus according to the present invention can be applied to any system. However, the following explanation refers to a light scanning apparatus which is applied to, for example, a point of sales system, that is, the so-called POS system. In a commodity market, it is important to have an account of the goods in-stock, to be able to calculate the volume of sales and to classify the goods which have been sold. If the goods to be traded are small in quantity and few in variety it is easy then to maintain an inventory of which goods are in stock, to calculate the volume of sales, and to classify the goods which have been sold. However, the above procedures are not so easy when dealing with an enormous quantity and a large variety of goods. In recent years, said POS system has been proposed. By utilizing the POS system, a large quantity and variety of goods can be monitered by using the computer, and accordingly, said calculation and classification of the sales and supply of goods can be performed automatically by virtue of the computer. In this POS system, since goods are monitored by the computer, information concerning each of the goods is marked directly on the goods in advance. Such information is marked on an outer surface of each of the goods by attaching a so-called bar-code label thereto. The bar-code is usually arranged by using UPC (Universal Product Code) symbols. The information on the bar-code, with regard to each of the goods, can be read and detected by the aid of a light scanning apparatus and a photo-sensor which is connected to an input of the computer. The light scanning apparatus provides a coherent light beam such as a laser beam which scans the bar-code while the photo-sensor receives the coherent light beam reflected by the bar-code label. The intensity of the reflected coherent light beam changes in accordance with the bar-code subsequently. The computer reads the information in accordance with changes in the intensity of the reflected coherent light beam provided from the photo-sensor, which intensity changes are in the form of a train of electric pulses.

The conventional light scanning apparatus is realized by utilizing a rotating polygonal mirror or a vibrating mirror. However, the disadvantages of such a light scanning apparatus utilizing the rotating polygonal mirror or the vibrating mirror are its high costs and complexities in structure.

In the prior art, the light scanning apparatus was preferably realized by utilizing the apparatus disclosed in the U.S. Pat. No. 3,614,193. The apparatus of the U.S. Pat. No. 3,614,193, was comprised, in combination, of a source of coherent electromagnetic radiation for producing a diverging beam of radiation, reflector means positioned to be illuminated by and operative to converge radiation from said source towards a first focal point located on a predetermined axis, spinner means having a spherical surface concentric with said predetermined axis and rotatable about said predetermined axis, said spinner means having a plurality of zone-type lenses circumferentially distributed about said spherical surface, and being so positioned relative to said reflector means that said converging radiation illuminates a sector of said spherical surface containing more than one zone lens, said lenses being operative to redirect said converging radiation toward respective scanning focal points, and motive means for rotating said spinner means about said predetermined axis, said scanning focal points describing cicular loci concentric with said predetermined axis.

The above-mentioned apparatus of the U.S. Patent was a superior light scanning apparatus only when it was used as a one-dimensional light scanning apparatus. However, a light scanning apparatus which is applied to said POS system, must be a two-dimensional light scanning apparatus. Therefore, the apparatus of the above U.S. Patent could not be used as a light scanning apparatus applicable to the POS system.

Consequently, it is an object of the present invention to provide a light scanning apparatus which acts as both a one-dimensional and a two-dimensional scanning apparatus, and further, is cheaply manufactured and simply constructed.

The present invention will become more apparent and its construction and operation better understood from the following detailed description, taken in conjunction with the accompanying drawings, in which.

Figure 4:
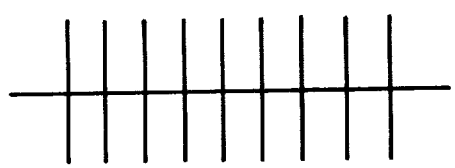
Figure 5:
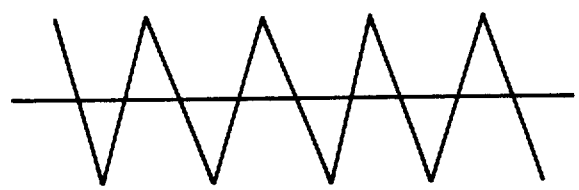

FIG. 4 schematically shows one example of a conventional two-dimensional scanning pattern exhibiting a right-crossing mode;

FIG. 5 schematically shows the other example of a conventional two-dimensional scanning pattern exhibiting a zig-zag and bar mode.

Figure 6A:
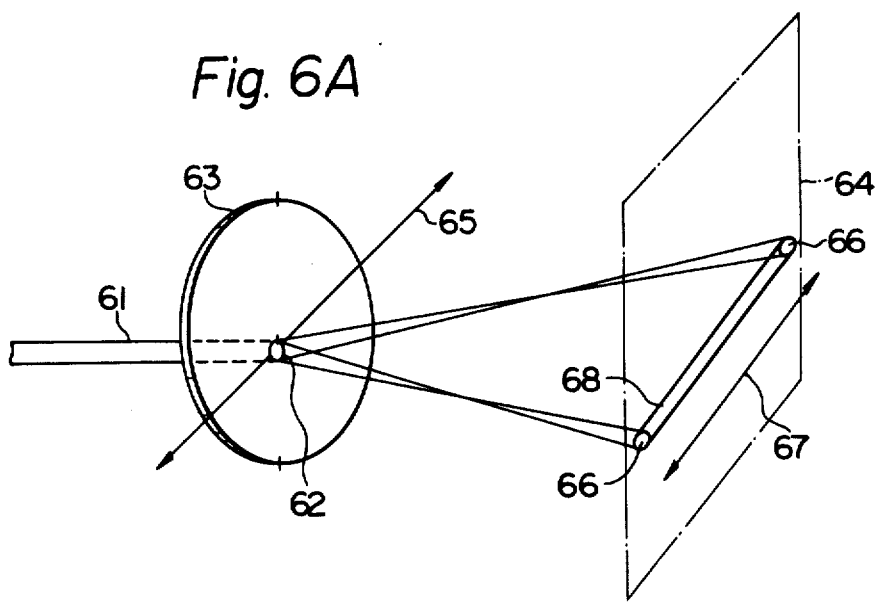
Figure 6B:
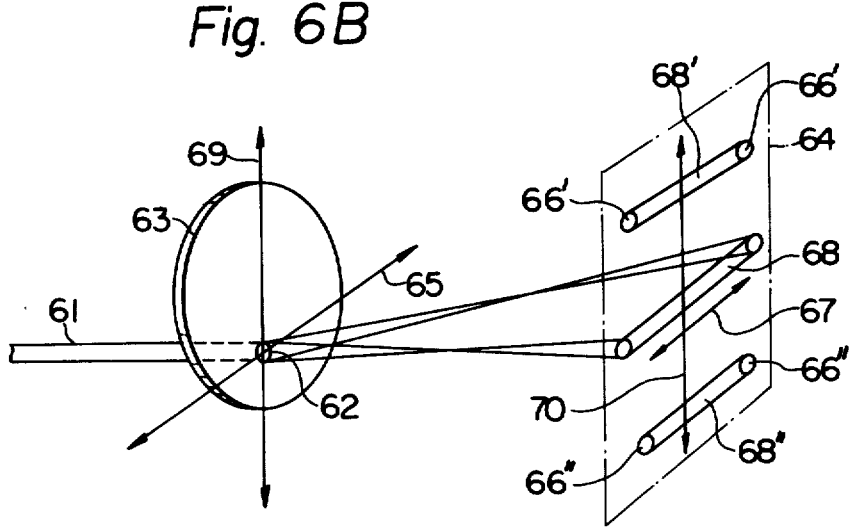
Figure 7:
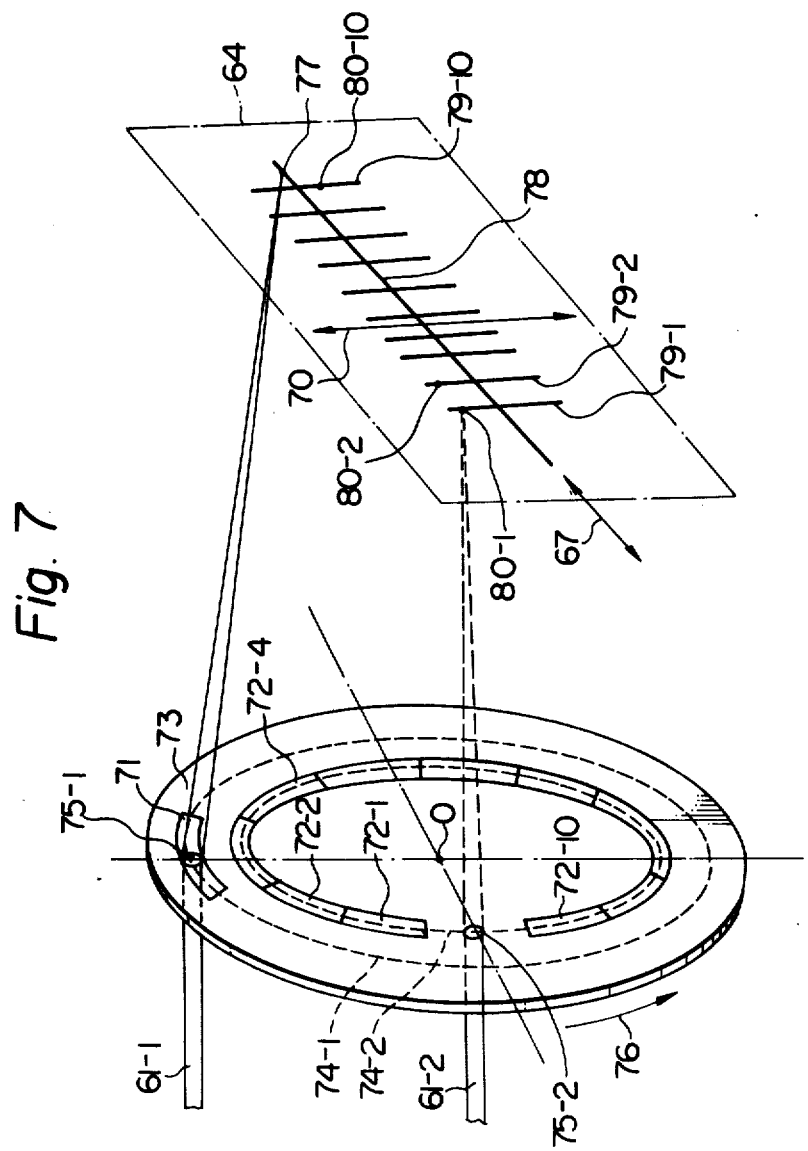
Figure 8:
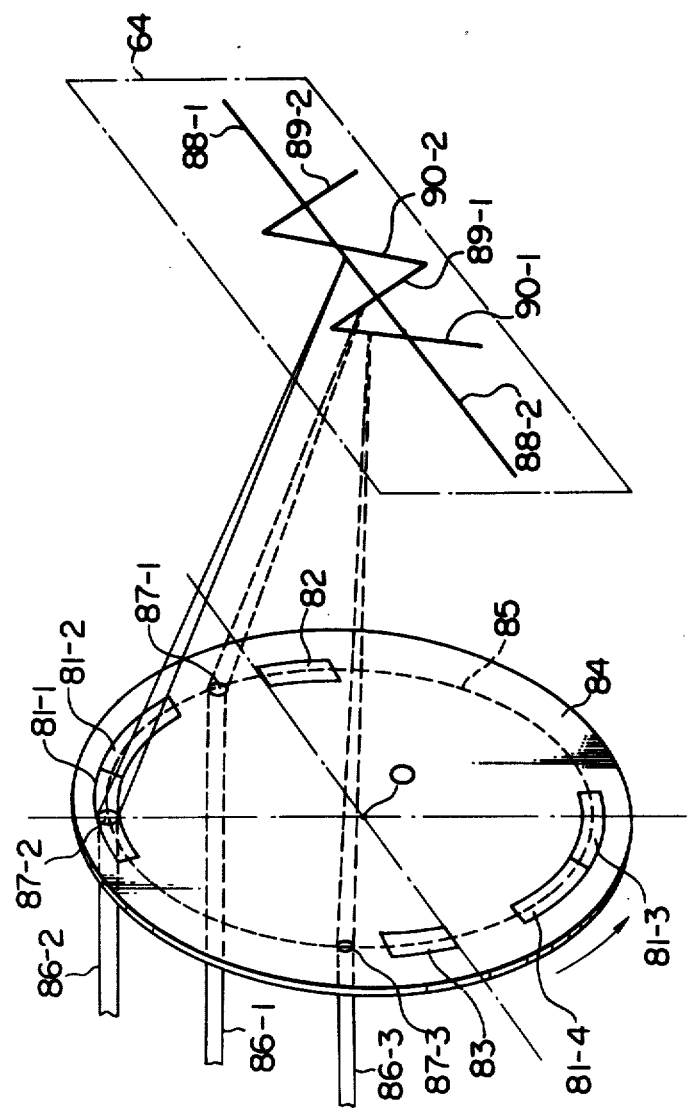
Figure 9:
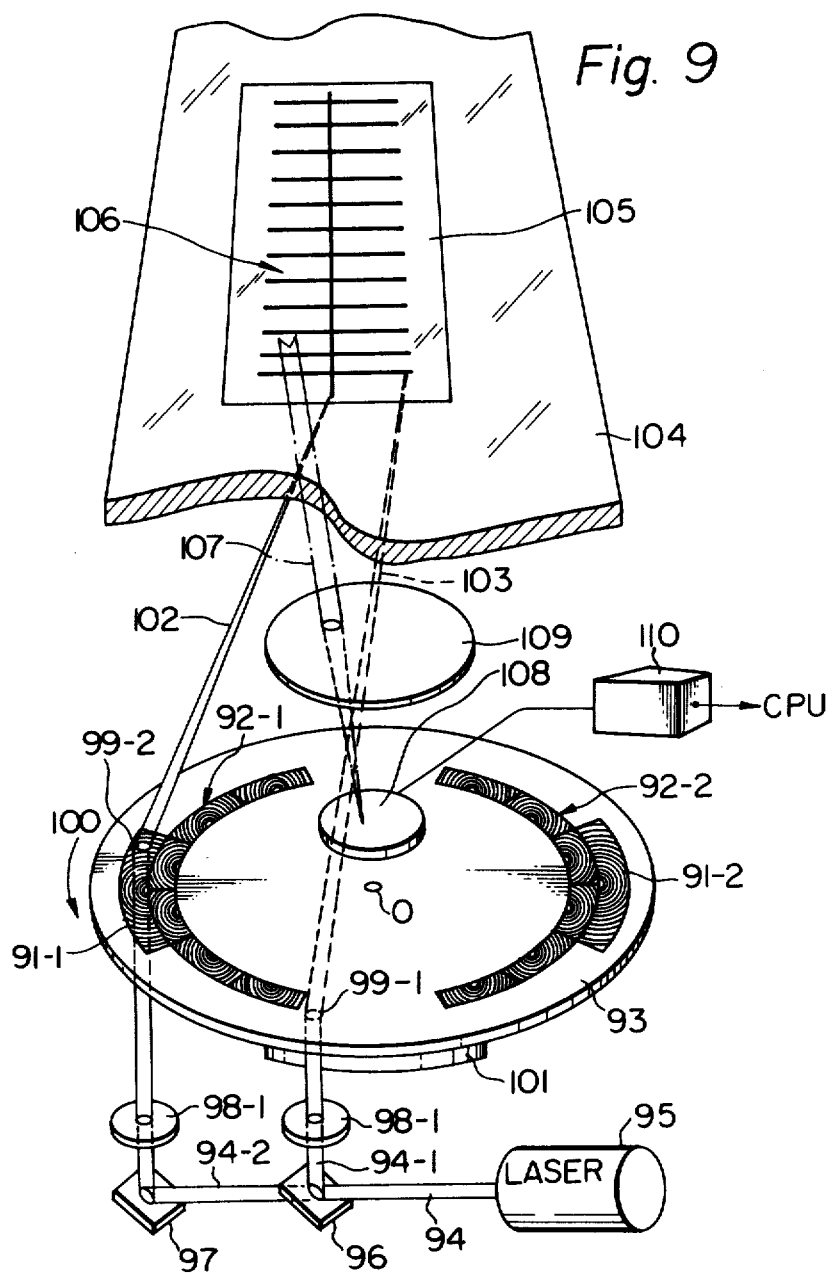
Figure 10:
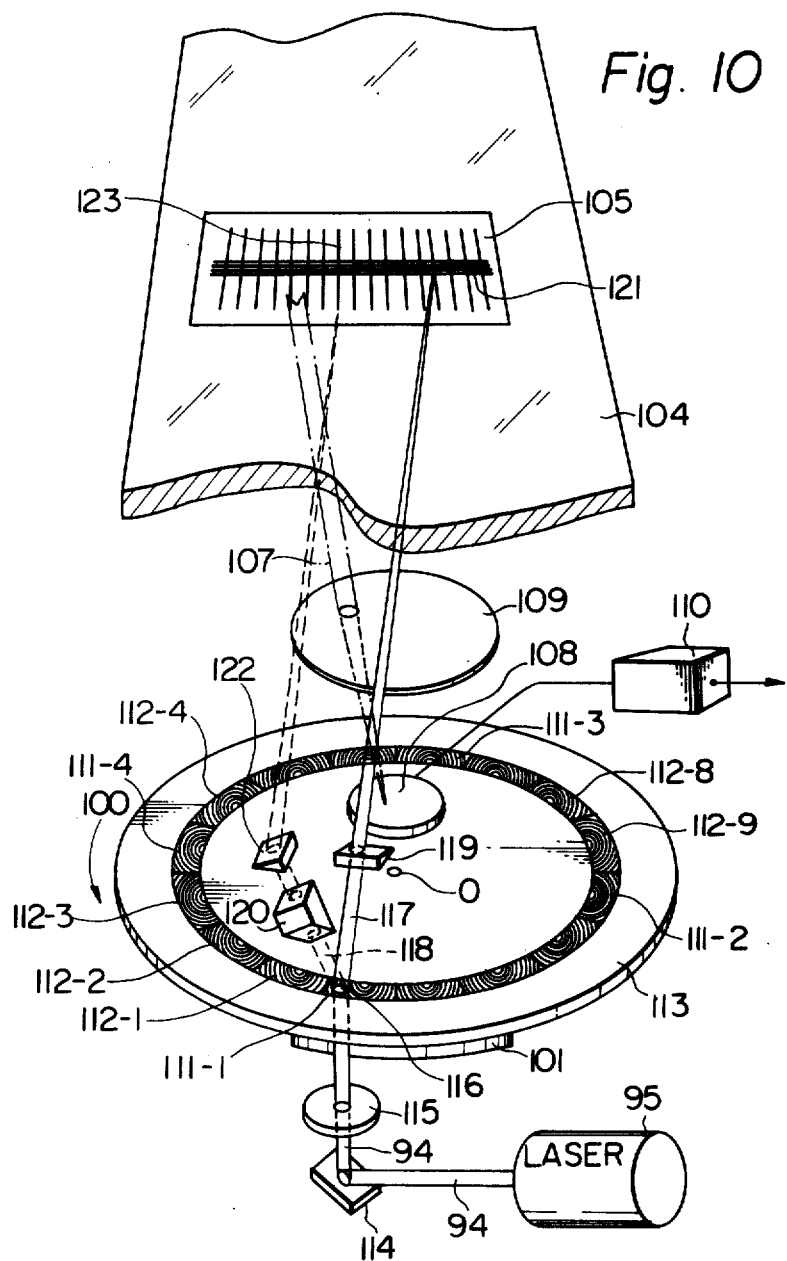
Figure 11:
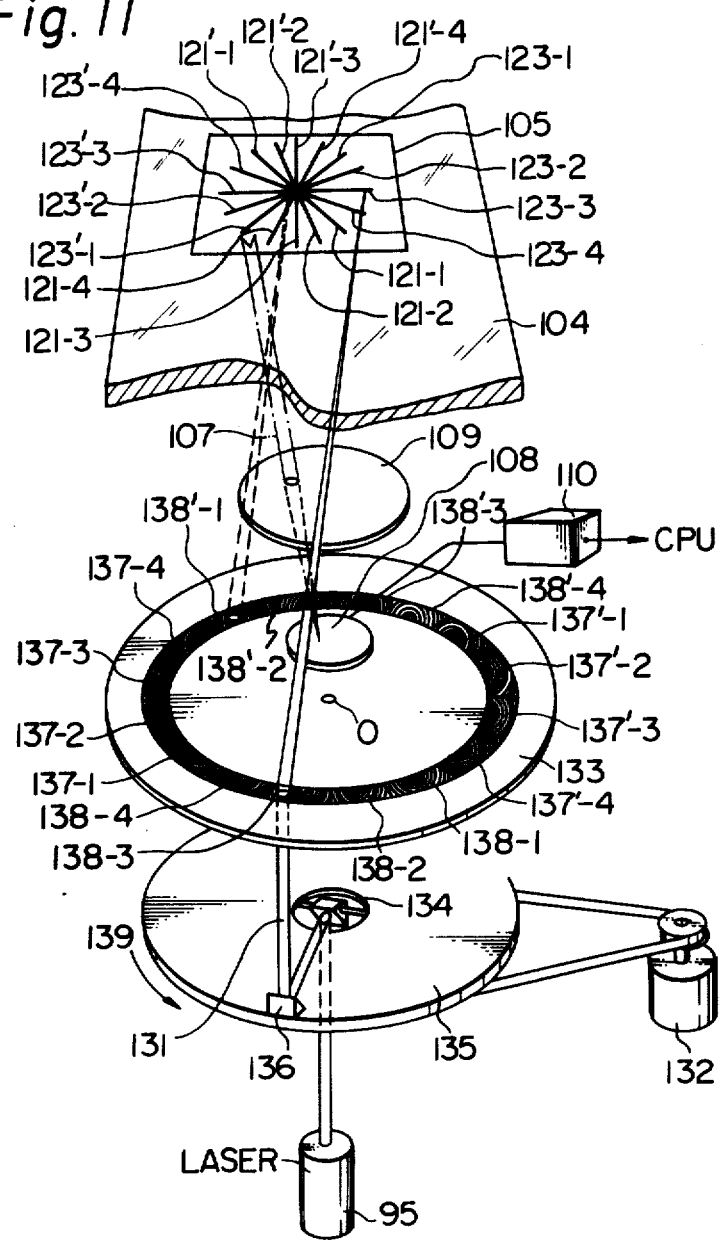
Figure 12:
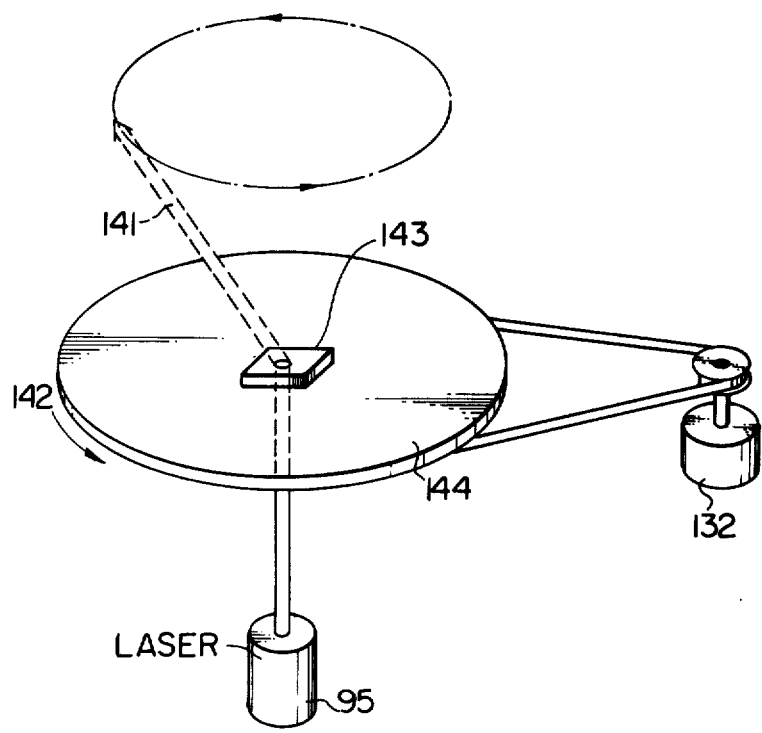
Figure 13:
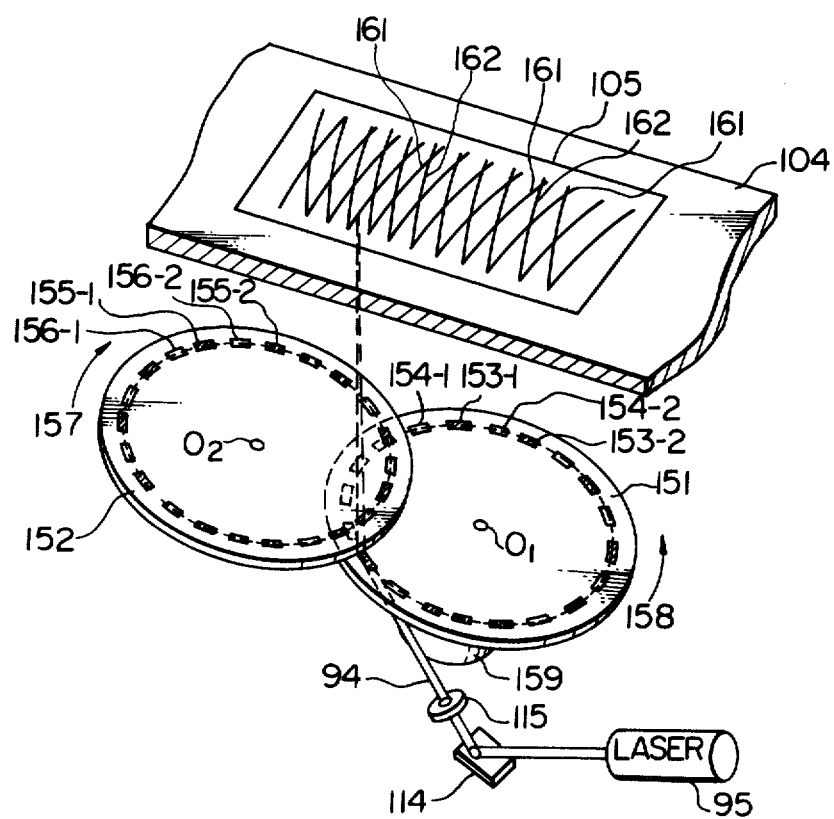
Figure 14:
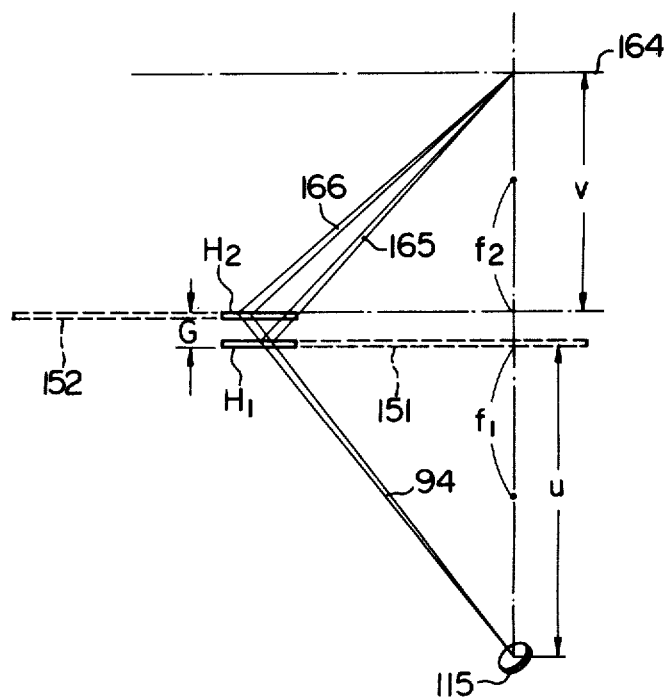

FIGS. 6A and 6B, respectively, are explanatory perspective views of a zone-type lens and a light beam which illuminates the zone-type lens and radiates therefrom;

FIG. 7 is a pictorial view to facilitate understanding of the basic construction of a light scanning apparatus according to the present invention, which apparatus can provide a scanning pattern exhibiting a right-crossing mode;

FIG. 8 is a pictorial view to facilitate understanding of the basic construction of a light scanning apparatus according to the present invention, which apparatus can provide a scanning pattern with a zig-zag and bar mode;

FIG. 9 is a pictorial view showing a first embodiment of a light scanning apparatus according to the present invention;

FIG. 10 is a pictorial view showing a second embodiment of a light scanning apparatus according to the present invention;

FIG. 11 is a pictorial view showing a third embodiment of a light scanning apparatus according to the present invention;

FIG. 12 is a perspective view showing a rotating means for rotating a laser beam, according to the present invention;

FIG. 13 is a pictorial view showing a fourth embodiment of a light scanning apparatus according to the present invention;

FIG. 14 is a chart to facilitate understanding of the relation between the focal length of each of the first holograms and the focal length of each of the second holograms, according to the fourth embodiment.

Figure 15:
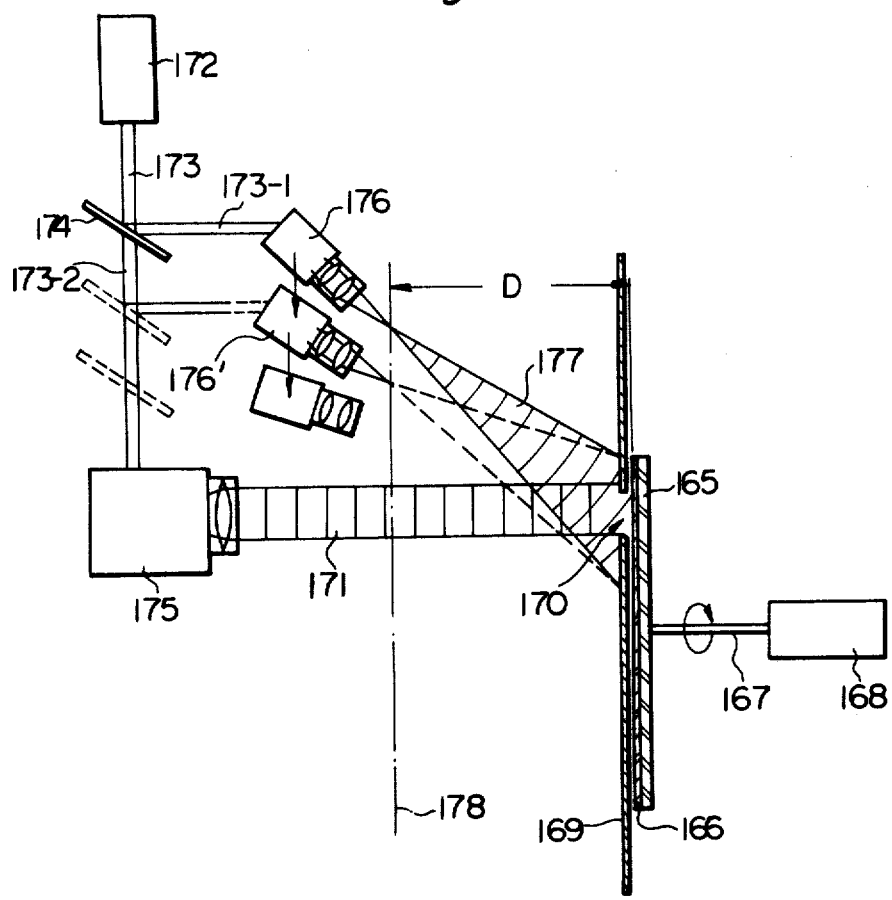
Figure 16:
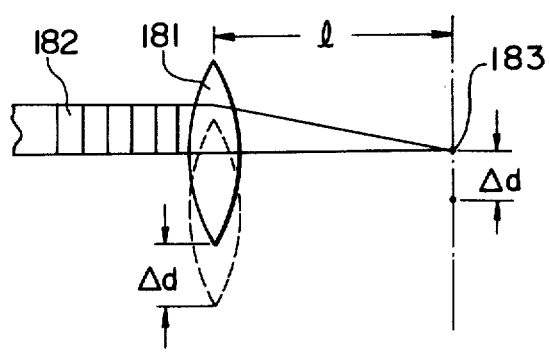
Figure 17:
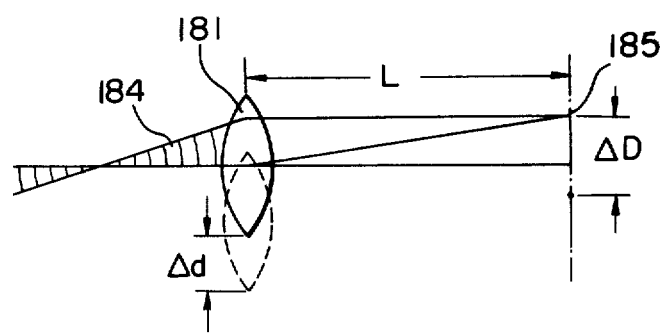
Figure 18A:
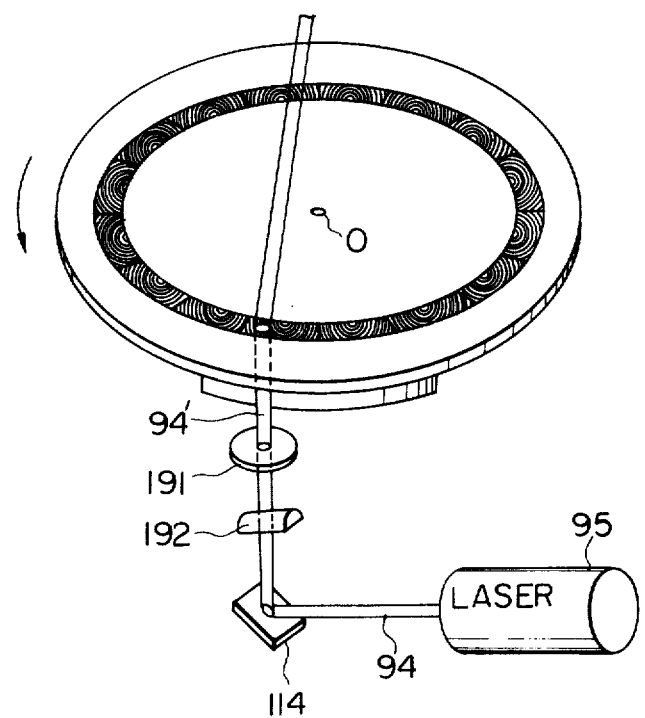
Figure 18B:
Figure 19:
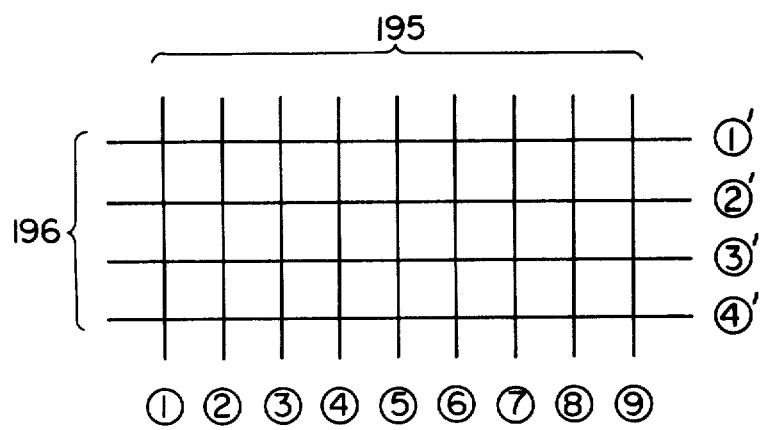
Figure 21:
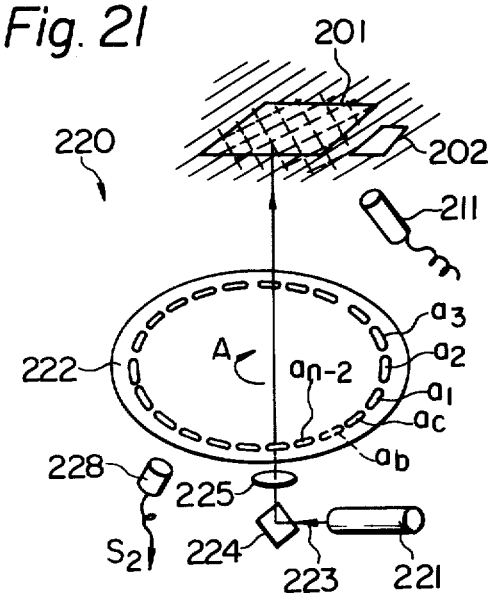
Figure 20:
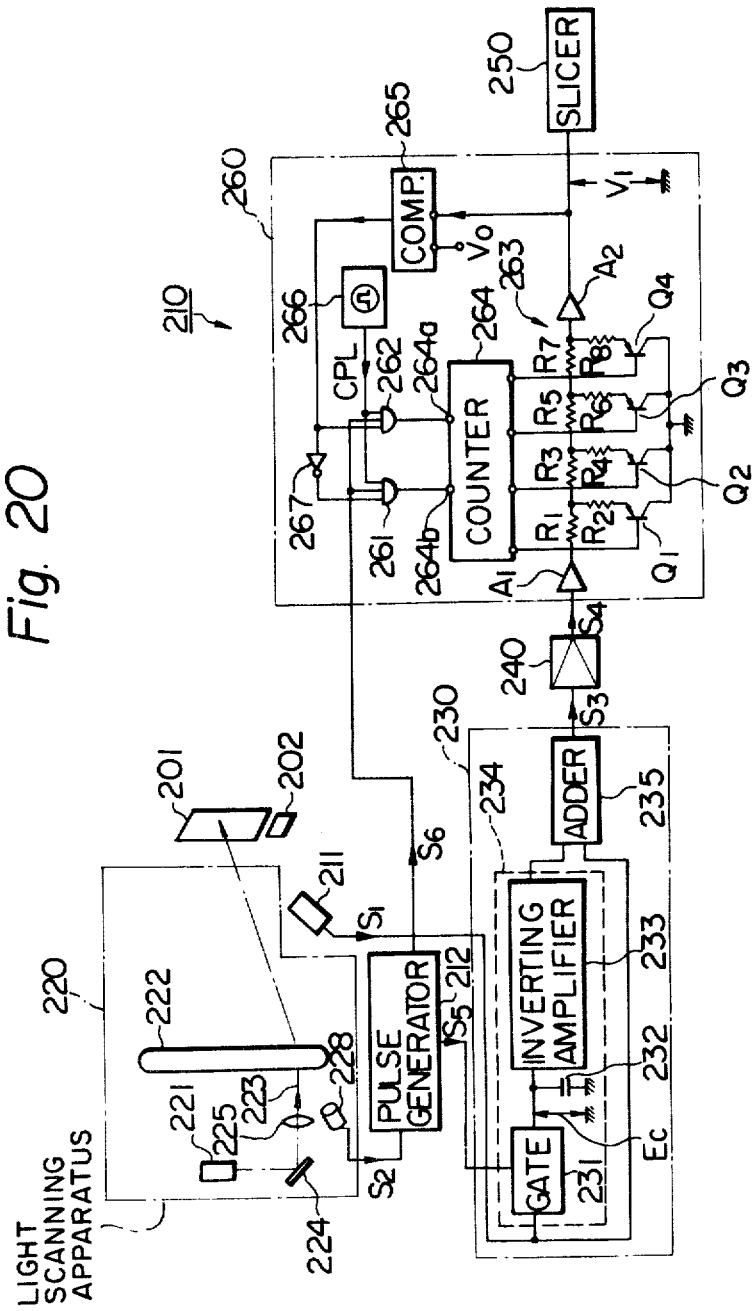
Figure 22:
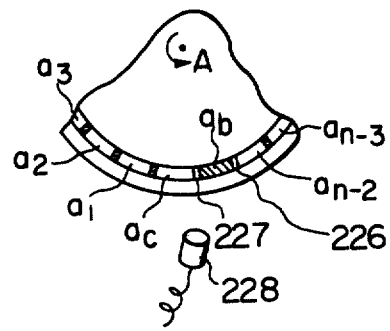
Figure 23:
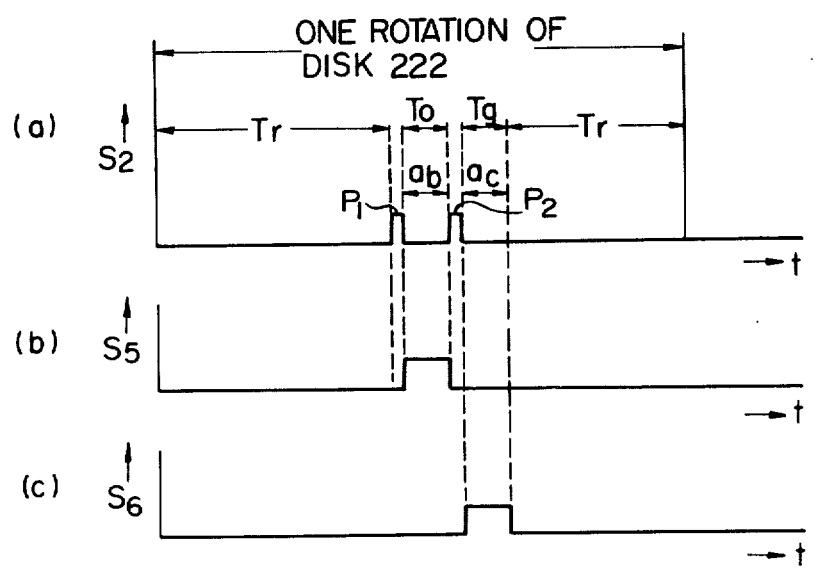

FIG. 15 is a schematically illustrated longitudinal sectional view of a manufacturing apparatus according to the present invention for producing the circular disk provided with holograms;

FIG. 16 shows light paths produced when a laser beam constructed by a parallel plane wave is applied to a hologram;

FIG. 17 shows light paths produced when a laser beam constructed by a spherical wave is applied to a hologram;

FIG. 18A is a partial perspective view of a fifth embodiment according to the present invention;

FIG. 18B is a perspective view showing a plano-concave lens;

FIG. 19 is a plane view of a scanning pattern exhibiting a lattice mode to facilitate understanding of the sequence for forming each of the scanning lines according to the present invention;

FIG. 20 is a block diagram showing a light scanning apparatus for reading a bar-code and a control apparatus, both of the present invention, whereby said control apparatus controls a slicer so that the slicer may provide electric pulse signals without producing errors in accordance with changes in the intensity of the reflected beam from the bar-code;

FIG. 21 is a partial perspective view of a light scanning apparatus according to the present invention;

FIG. 22 is a bottom view, partially cut away, of the circular disk shown in FIG. 21;

FIG. 23 shows timing charts of signal $S_2$ in row (a), of signal $S_5$ in row (b) and of signal $S_6$ in row (c).

Figure 1:
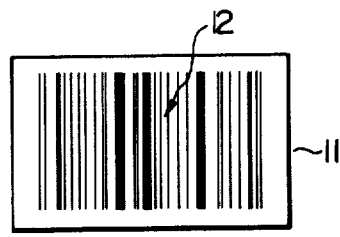
FIG. 1 is an enlarged plane view showing a conventional bar-code label.

FIG. 1 shows an enlarged plane view of a bar-code label which is attached to the outer surface of each of the goods to be scanned (not shown). In FIG. 1, numeral 11 represents a bar-code label. Numeral 12 is an examaple of a bar-code. The bar-code 12 is usually printed on the surface of the bar-code label 11. The bar-code 12 is arranged by using UPC symbols to represent data, such as the cost, maker, category and date of production of each of the goods (not shown) to which said bar-code label 11 is attached. The information with regard to each of the goods is read and processed by a computer (not shown), whereby the reading is automatically done by a combination of a light scanning apparatus and a photo-sensor, which are not shown. The light scanning apparatus provides a coherent light beam (not shown), such as a laser beam, which scans the bar-code 12 traversely while the photo-sensor receives the coherent light beam reflected by the bar-code 12. The intensity of the reflected coherent light beam changes in accordance with the arrangement of the bar-code 12.

Figure 2:
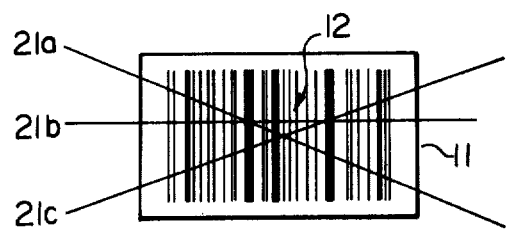
FIG. 2 is an enlarged plane view of a conventional bar-code label and scanning lines, in which any one of the scanning lines traverses the entire area of the bar-code.

Said coherent light beam provided from the light scanning apparatus, has to scan the bar-code by traversing its entirety, such as is shown in FIG. 2. In FIG. 2, lines 21a, 21b and 21c express the scanning lines. Either one of the scanning lines 21a, 21b or 21c may scan the bar-code 12 by traversing its entirety.

Figure 3:
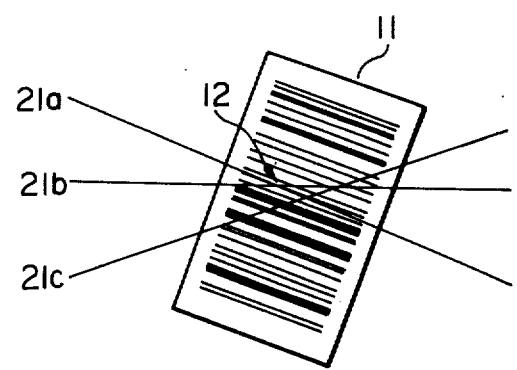
FIG. 3 is an enlarged plane view of a conventional bar-code label and scanning lines, in which none of the scanning lines traverses the entire area of the bar-code.

However, if the bar-code label is located at some particular angles with respect to the light scanning beam, said coherent light beam may not be able to scan the entire bar-code. That is, if the bar-code label is located at some particular angles such those shown in FIG. 3, then neither one of the scanning lines 21a, 21b or 21c will be able to scan the bar-code 12 by traversing its entirety. At this time, it is impossible for a computer to read information without producing any errors. Therefore, since each of the scanning lines 21a, 21b and 21c is one-dimensional, it is difficult, then, for a computer to read information without producing any errors, especially when the bar-code label is revolving at some particular angles with respect to the scanning line.

Accordingly, to prevent the above error-producing problem, two-dimentional scanning is requested. When two-dimensional scanning of the bar-code is utilized, such as is shown in FIGS. 4 and 5, it is then assured that the computer will be able to read information without producing errors even though the bar-code label is being revolved at any angle. FIG. 4 shows one example of a two-dimensional scanning pattern which exhibits a right-crossing mode. FIG. 5 shows the other example of a two-dimensional scanning pattern which exhibits a zig-zag and bar mode.

Now, a light scanning apparatus according to the present invention will be explained hereinafter. FIGS. 6A and 6B are explanatory perspective views of a zone-type lens and a light beam which illuminates the zone-type lens and radiates therefrom. FIGS. 6A and 6B will facilitate understanding of the principle of a light scanning apparatus according to the present invention. In FIG. 6A, a coherent light beam 61 that is a laser beam is projected on a point 62 of a lens 63. The laser beam 61 is then transmitted through the lens 63 so that it reaches an image surface 64. When the lens 63 is shifted in a direction along the arrow 65 perpendicular to the direction of the fixed laser beam 61, a light spot 66 traverses the image surface 64 in a direction along the arrow 67, thereby obtaining one scanning line 68. If the lens 63 is made of a convex lens, the light spot 66 is formed by refraction of the laser beam 61, while, if the lens 63 is made of a hologram, the light spot 66 is formed by diffraction of the laser beam 61. In FIG. 6B, if the lens 63 is shifted in a direction along the arrow 65 and in a direction along the arrow 69 alternatingly, light spots 66' and 66" traverse the image surface 64 in a horizontal direction parallel to the arrow 67, and thereby scanning lines 68' and 68" are alternatingly obtained. As a result, the entire scanning line 68 is also shifted on the image surface 64 in a vertical direction along the arrow 70.

FIG. 7 will illustrate more clearly the principle of the light scanning apparatus according to the present invention. FIG. 7 shows an arrangement of lenses which provides a scanning pattern having a right-crossing mode, as is shown in FIG. 4. In FIG. 7, a first zone-type lens that is a hologram 71 together with second zone-type lenses that are holograms 72-1, 72-2 up through 72-10, are secured by being inserted into a circular disk 73. The hologram 71 is located on one circular locus 74-1, and the other holograms 72-1, 72-2 up through 72-10 are arranged along the other circular locus 74-2. In addition, the circular loci 74-1 and 74-2 are concentrically arranged with respect to the central point 0 of the circular disk 73. A first laser beam 61-1 fixedly illuminates a point 75-1 on the circular disk 73. A second laser beam 61-2 fixedly illuminates a point 75-2 on the circular disk 73. When the circular disk 73 rotates in a direction along the arrow 76, the first laser beam 61-1 illuminates the entire path of the circular locus 74-1 and the second laser beam 61-2 illuminates along the entire path of the circular locus 74-2. Accordingly, the hologram 71 intersects once with the first laser beam 61-1 each time the circular disk 73 makes one rotation, and also each of the holograms 72-1, 72-2 up through 72-10 intersects once with the second laser beam 61-2 each time the circular disk 73 makes one rotation. On one hand, when the hologram 71 intersects with beam 61-1 at point 75-1, a first focal point 77, which is formed by diffraction of the hologram 71, is caused to move in a direction along the arrow 67, and thereby a scanning line 78 is obtained, which scanning line 78 corresponds to the scanning line 68 shown in FIG. 6A. On the other hand, when each of the holograms 72-1, 72-2 up through 72-10 intersects with beam 61-2 at point 75-2, each of the second focal points 80-1, 80-2 up through 80-10 formed by diffraction is caused to move in a direction parallel to the arrow 70, respectively. It should be noted that since the hologram 71 intersects horizontally with beam 61-1 at point 75-1, a horizontal scanning line 78 can, thus, be obtained; (likewise, since each of the holograms 72-1, 72-2 up through 72-10 intersects vertically with 61-2 at point 75-2, vertical scanning lines 79-1, 79-2 up through 79-10 are obtained. Further, it should be noted that each of the holograms 72-1, 72-2 up through 72-10 is previously designed so that each of the focal points 80-1, 80-2 up through 80-10 may be projected on the image surface 64 along the correspondingly different scanning lines 79-1, 79-2 up through 79-10, respectively. When the circular disk 73 is applied to said POS system, the horizontal scanning line 78 and the vertical scanning lines 79-1, 79-2 up through 79-10 should not be formed on the image surface 64 at the same time. Therefore, as shown in FIG. 7, when the hologram 71 intersects beam 61-1 at point 75-1, holograms 72-1, 72-2 up through 72-10 should not be intersecting beam 61-2 at point 75-2. Accordingly the first laser beam 61-1 can be obtained by mounting a mirror (not shown) on the circular disk 73 between the holograms 72-1 and 72-10. The first laser beam 61-1 is obtained by reflecting the second laser beam 61-2 by using said mirror and another mirror (not shown).

FIG. 8 will illustrate more clearly to the principle of the light scanning apparatus according the present invention. FIG. 8 shows an arrangement of lenses which provides the zig-zag and bar mode of scanning pattern as is shown in FIG. 5. In FIG. 8, first zone-type lenses or holograms 81-1, 81-2, 82-3 and 81-4, a second zone-type lens or hologram 82 and a third zone-type lens that or hologram 83 are secured by being inserted into a circular disk 84. These holograms are arranged along a circular locus 85. A first laser beam 86-1, a second laser beam 86-2 and a third laser beam 86-3 fixedly illuminate the corresponding points 87-1, 87-2 and 87-3, respectively. The points 87-1 and 87-2 are located with an angle of 60° between them with respect to a central point O, and the points 87-2 and 87-3 are located with an angle of 60° between them with respect to the central point O. Each pair of the following pairs of holograms 81-1 and 81-3, holograms 83 and 82, holograms 81-4 and 81-2 is arranged, respectively, with an angle of 180° between them with respect to the central point O. Further, each pair of the following pairs of holograms 81-1 and 83, holograms 83 and 81-4, holograms 81-3 and 82, holograms 82 and 81-2 is arranged, respectively, with an angle of 80° between them with respect to the central point O. When the holograms 81-1 and 81-2 intersect with beam 86-2 at point 87-2, scanning lines 88-1 and 88-2 are obtained, respectively, on the image surface 64. When the holograms 82 intersects with beam 86-1 at point 87-1, scanning lines 89-1 and 89-2 are obtained. When the holograms 81-1 and 81-2 intersect beam 86-3 at point 87-3, scanning lines 90-1 and 90-2 are obtained, respectively. The holograms 81-3, 81-4 and 83 act in the same manner as described with respect to the holograms 81-1, 81-2 and 82, respectively. It should be noted that each of the pairs of holograms 81-1, 81-3, holograms 81-2, 81-4 and holograms 82, 83 is previously designed so that each of its corresponding focal points may be projected on the image surface 64 along the correspondingly different scanning lines. In FIG. 8, when one of the holograms intersects a beam at one of the points, the other holograms are then unable to intersect beams at other points, and accordingly all the scanning lines cannot be provided at the same time but alternatingly.

FIG. 9 is a pictorial view showing a first embodiment of a light scanning apparatus according to the present invention. In FIG. 9, both first zone-type lenses or holograms 91-1 and 91-2, and second zone-type lenses or holograms 92-1 and 92-2 are secured by being inserted into a circular disk 93. The holograms 91-1 and 91-2 are located on one circular locus defined by a central point O and the holograms 92-1 and 92-2 are arranged along the other circular locus defined by the central point O. A coherent light beam that is a laser beam 94 which is radiated by a He-Ne laser source 95, is separated into two laser beams 94-1 and 94-2 by means of a half mirror 96. The laser beam 94-2 is reflected toward the circular disk 93 by means of a mirror 97. The laser beams 94-1 and 94-2, respectively transmitted through convex lenses 98-1 and 98-2 to fixedly illuminate respective points 99-1 and 99-2 on the circular disk 93. When the circular disk 93 is rotated in a direction along arrow 100 by an electric motor 101, each of the holograms 91-1 and 91-2 provides a scanning laser beam representatively shown as numeral 102, and each of a plurality of the holograms 92-1 and also each of a plurality of the holograms 92-2 provide a scanning laser beam representatively shown as numeral 103. Further, the scanning laser beams 102 and 103 form a scanning pattern of a right-crossing mode as is previously mentioned by referring to FIG. 7.

The light scanning apparatus shown in FIG. 9 is preferably applied to said POS system. In FIG. 9, numeral 104 represents a part of a POS terminal device. The device 104 has a transparent window 105 for scanning said bar-code label shown as 11 in FIG. 1. When each of goods (not shown in FIG. 9) is located above the window 105 and when the bar-code label which is attached to the outer surface of each of the goods faces towards the window 105, the scanning laser beams 102 and 103 scan the bar-code (shown as 12 in FIG. 1) with a scanning pattern 106 having a right-crossing mode. Each of the scanning laser beams 102 and 103 is reflected by the bar-code label the reflected scanning laser beam 107 is collected by a condenser lens 109, if necessary, and illuminates a photo-sensor 108 comprised of a photomultiplier tube. The intensity of the reflected scanning laser beam 107 changes in accordance with the bar-code, and the changes of the intensity are converted to a train of electric pulses by the photo-sensor 108. Said train of electric pulses from the photo-sensor 108 is demodulated by a demodulator 110. The output signals are then transmitted to a central processing unit (CPU) not shown in FIG. 9.

FIG. 10 is a pictorial view showing a second embodiment of a light scanning apparatus according to the present invention. In FIG. 10, those elements which are the same elements already explained with reference to FIG. 9 are represented by the same numerals as found in FIG. 9. Both first zone-type lenses or holograms 111-1, 111-2 through 111-4 and second zone-type lenses or holograms 112-1, 112-2 . . . are secured into a circular disk 113. These holograms are arranged along one circular locus defined by a central point O. The laser beam 94 is reflected toward the circular disk 113 by a mirror 114. The laser beam 94 is then transmitted through a convex lens 115 to fixedly illuminate a point 116 on the circular disk 113. When the circular disk 113 is rotated in a direction along arrow 100 by the electric motor 101, each of the holograms 111-1, 111-2 . . . provides a scanning laser beam 117 which illuminates a prism 119, while each of the holograms 112-1, 112-2 . . . provides a scanning laser beam 118 which illuminates the Dove prism 120. This is because, each of the holograms 111-1, 111-2 . . . is previously designed so that the scanning laser beam which is transmitted therethrough may be directed to the prism 119 by diffraction, and also each of the holograms 112-1, 112-2 . . . is previously designed so that the scanning laser beam which is transmitted therethrough may also be to directed the Dove prism 120 by diffraction. The scanning laser beam 117 which is transmitted through the prism 119, forms one of the corresponding scanning lines 121 which extend from right to left in FIG. 10. The scanning laser beam 118 which transmitts through both the Dove prism 119 and a prism 122, forms one of the corresponding scanning lines 123 which extend from top to bottom on the images surface in FIG. 10. It should be recognized that the direction of the diffraction of the scanning laser beam 118 can easily be adjusted by the Dove prism 120 at any angle of from 0° through 360°.

FIG. 11 is a pictorial view showing a third embodiment of a light scanning apparatus according to the present invention. In the first and second embodiments shown in FIGS. 9 and 10, respectively, the circular disk 93 in FIG. 9 is rotated by the motor 101 with respect to the fixed laser beams 94-1 and 94-2, and also the circular disk 113 in FIG. 10 is rotated by the motor 101 with respect to the fixed laser beam 94. Conversely, in the third embodiment of FIG. 11, a laser beam 131 is rotated in a direction along arrow 139 by an electric motor 132 with respect to a fixed circular disk 133. The He-Ne laser source 95 illuminates a mirror 134 which is located at the center of a rotating disk 135 and revolves together therewith. The laser beam which is directed to the mirror 134, is redirected to a mirror 36 which rotates together with the rotating disk 135. First zone-type lenses, that is, first holograms 137-1, 137-2 through 137-4, 137'-1, 137'-2 through 137'-4 are preferably arranged in a manner as shown in FIG. 11, and second zone-type lenses, that is, second holograms 138-1, 138-2 through 138-4, 138'-1, 138'-2 through 138'-4 are preferably arranged in a manner such as shown in FIG. 11. Each of the first holograms forms one of the corresponding scanning lines 121-1, 121-2 . . . 121-4, 121'-1, 121'-2 . . . 121'-4, and each of the second holograms forms one of the corresponding scanning lines 123-1, 123-2 . . . 123-4, 123'-1, 123'-2 . . . 123'-4. The advantages of the third embodiment are as follows. Firstly, the Dove prism which is required in the second embodiment, can be omitted. Secondly, no detrimental vibrations which may occur on the circular disk due to the electric motor are generated.

FIG. 12 is a perspective view showing a rotating means for rotating a laser beam, according to the present invention. A laser beam 141 is rotated in a direction along the arrow 142 by the electric motor 132 in the following manner. The laser beam produced from the He-Ne laser source 95 is refracted or diffracted by an element 143 which is located on the center of a rotating disk 144. While the rotating disk 144 is being rotated the element 143 also revolves simultaneously. Accordingly, the laser beam 141 rotates along a circular locus while being refracted by the rotating element 143 as indicated by a dot-dash line in FIG. 12. The element 143 may be comprised of a prism or a hologram.

FIG. 13 is a pictoral view showing a fourth embodiment according to the present invention, where the photosensor 108, the condenser lens 109 and the demodulator 110 (all shown in FIG. 9) are omitted and not shown in FIG. 13. In FIG. 13, there are two circular disks 151 and 152. First zone-type lenses, that is, holograms 153-1, 153-2 . . . and first through-holes 154-1, 154-2 . . . are arranged alternatingly along one circular locus defined by a central point O, of the first circular disk 151. Second zone-type lenses, that is, holograms 155-1, 155-2 . . . and second through-holes 156-1, 156-2 . . . are arranged alternatingly along one circular locus defined by a central point $O_2$ of the second circular disk 152. The first and second circular disks 151 and 152 are rotably supported by fixing means (not shown). The second circular disk 152 is located slightly above the first circular disk 151. The second circular disk 152 rotates in a direction along the arrow 157 in synchronism with the first circular disk 151. The disk 151 is rotated in a direction along the arrow 158 by an electric motor 159. The holograms 153-1, 153-2 . . ., the through-holes 154-1, 154-2, the holograms 155-1, 155-2 . . . and the through-holes 156-1, 156-2 . . . are arranged in such a relation that either of the holograms 155-1, 155-2 . . . has to coincide with any one of the through-holes 154-1, 154-2 . . . and any one of the holograms 153-1, 153-2 . . . has to coincide with any one of the through-holes 156-1, 156-2 . . . . Therefore, the laser beam 94 can be transmitted through one of the through-holes 154-1, 154-2 . . . and one of the holograms 155-1, 155-2, at the same time. The laser beam 94 can also be transmitted through one of the holograms 153-1, 153-2 . . . and one of through-holes 156-1, 156-2 . . . at the same time. When the first circular disk 151 and also the second circular disk 152 rotate at the same time, one of the scanning lines 161 is formed by one of the corresponding holograms 153-1, 153-2 . . . and also, one of the scanning lines 162 is formed by one of the corresponding holograms 155-1, 155-2 . . . on the transparent window 105 resulting in a lattice scanning pattern.

In the fourth embodiment, since the second circular disk 152 is located slightly above the first circular disk 151, the focal length of each of the holograms 153-1, 153-2 . . . should be different from a focal length of each of the holograms 155-1, 155-2 . . . . By referring to FIG. 14, the relation between the focal length of each of the holograms 153-1, 153-2 . . . (shown in FIG. 13) and the focal length of each of the holograms 155-1, 155-2 . . . (shown in FIG. 13) is explained. In FIG. 14, one of the holograms $H_2$ located on the second circular disk 152 is placed above one of the holograms $H_1$ located on the first circular disk 151 at a distance G. The distance from the convex lens 115 to the hologram $H_1$ is represented by U. The distance from the image surface 164 that is the window (shown as 105 in FIG. 13) to the hologram $H_2$ is represented by V. The focal lengths of the holograms $H_1$ and $H_2$ are represented by $f_1$ and $f_2$, respectively. Numeral 94 represents the laser beam and numerals 165 and 166 represent scanning laser beams provided by the holograms $H_1$ and $H_2$, respectively. From FIG. 14, the following equations are obtained:

$$\frac{1}{U} + \frac{1}{V+G} = \frac{1}{f_1} \quad (1)$$

accordingly, $$f_1 = \frac{U(V+G)}{U+V+G} \quad (2)$$

is obtained. Similarly, $$\frac{1}{U+G} + \frac{1}{V} = \frac{1}{f_2} \quad (3)$$

accordingly, $$f_2 = \frac{V(U+G)}{U+V+G} \quad (4)$$

is obtained.

The above-mentioned circular disks 73 (shown in FIG. 7), 84 (shown in FIG. 8), 93 (shown in FIG. 9), 113 (shown in FIG. 10) and 133 (shown in FIG. 11) are, respectively, manufactured by the following method. The method for manufacturing each of the circular disks which are provided with first zone-type lenses, that is, first holograms and with second zone-type lenses, that is, second holograms, is explained by referring to FIG. 15. FIG. 15 is a schematically illustrated longitudinal sectional view of a manufacturing apparatus, according to the present invention, for producing the circular disk provided with the holograms. In FIG. 15, 165 is a transparent glass plate which is in the form of a circular disk, and 166 is a photosensitive layer, for example a silver salt layer which is coated on the surface of the glass plate 165. A plurality of holograms to be manufactured is formed in the layer 166. The glass plate 165 is supported at the central point thereof by a shaft 167 of an electric pulse motor 168. A mask 169 is fixedly located in front of the layer 166. The mask has a through-hole 170 which has the same form as that of the hologram to be manufactured. A He-Ne laser source 172 provides a laser beam 173 and the laser beam 173 is separated into two laser beams 173-1 and 173-2 by means of a half mirror 174. The laser beams 173-1 and 173-2 are applied to a first optical device 175 and a second optical device 176, respectively. The first optical device provides a reference wave 171 which illuminates the layer 166 through the through-hole 170. The second optical device 176 provides a spherical wave 177 which also illuminates the layer 166 through the through-hole 170. Then interference fringes are obtained on the layer 166, which interference fringes for a hologram. At first a first hologram which corresponds to, for example, hologram 137-1 in FIG. 11, is formed on the layer 166 by the second optical device 176 and the first optical device 175. A focal point of the second optical device 176 has to be positioned on a dot-dash line 178. A distance D from the line 178 and the layer 166 corresponds to, for example, the distance from the circular disk 113 to the transparent window 105 in FIG. 10. When the first hologram (111-1) has been formed, the second optical device is shifted to a location designated by numeral 176'. A focal point of the device 176' also has to be positioned on the line 178. At the same time, the glass plate 165 together with the layer 166 is rotated at predetermined angles by the electric pulse motor 168. Then a second hologram which corresponds, for example, to hologram 112-2 in FIG. 10 is formed on the layer 166 by utilizing the devices 175 and 176'. Similarly, a third hologram, a fourth hologram .. . are obtained.

In the first through the fourth embodiments, the length of each of the scanning lines which are formed on the window 105, is equal to the length of the movement of the corresponding hologram. Accordingly, if it is necessary to expand the length of each of the scanning lines, the corresponding hologram has to move along an increased path. As a result, the circular disk provided with the holograms must be increased in size. The reason why the length of each of the scanning lines must equal the length of the movement of the corresponding hologram is that the laser beam which illuminates each of the holograms is in the form of a parallel plane wave. The reason will be clarified by the referring to FIG. 16. In FIG. 16, a hologram is schematically represented by a convex lens 181. When a parallel plane wave 182 is applied to the lens 181, a focal point 183 is projected on a plane located at a distance l. The distance l is the focal length of the lens 181. Further, when the lens moves with a distance Δd, the focal point 183 also moves with a distance Δd.

Contrary to the above, if the parallel plane wave 182 is replaced by diverging wave, the focal point may move with a far longer distance than the distance with which the lens 181 moves. This will be clarified by referring to FIG. 17. In FIG. 17, 184 represents the diverging wave. When the wave 184 is applied to the lens 181, a focal point 185 is projected on a plane located at a distance L. Further, when the lens 181 is moved with a distance Δd, the focal point 185 moves with a distance ΔD, where the distance ΔD is derived from the following equation:

$$\Delta D = \frac{L}{l} \Delta d$$

Thus, the distance Δd is expanded by a coefficient (L/l). As apparent from the above explanation by referring to FIGS. 16 and 17, the length of each of the scanning lines can be expanded by utilizing a laser beam consisting of a spherical wave without increasing the size of the circular disk.

However, when the laser beam which consists of a spherical wave is utilized, the following defect is brought about. Said defect involves the projected focal point being not in the form of a true circle but being in the shape of an ellipse due to an aberration of the hologram. If the projected focal point is not a true circle in shape, it would be quite impossible to obtain a sharp scanning line, and as a result, it would be difficult for the computer to read the information on the bar-code without error. The above defect can be easily eliminated by utilizing a cylindrical lens. The cylindrical lens will compensate for the aberration of the hologram and the projected focal point will then become a true circle in shape.

FIG. 18A is a partial perspective view of a fifth embodiment utilizing a laser beam which has a spherical wave and further includes a cylindrical lens. In FIG. 18A, a laser beam 94 is transformed into a laser beam 94' which consists of a spherical wave obtained by using a concave lens or a convex lens 191. The above-mentioned aberration of the hologram is compensated by utilizing a cylindrical lens 192. The cylindrical lens 192 can be changed to a plano-concave lens such as is shown in FIG. 18B.

The light scanning apparatus of the present invention forms at least two kinds of scanning lines, although a single circular disk is provided. Each of first scanning lines extends in a first direction, while each of second scanning lines extends in a second direction which intersects said first direction. It is important for the light scanning apparatus to be able to traverse the entire area of said bar-code in a short time by utilizing either one of the first or second scanning lines. According to the descriptions of an experiment, it has been found that the sequence for forming each of the first and second scanning lines should be as follows. The sequence is mentioned by referring to FIG. 19, wherein a scanning pattern with, for example, a lattice mode is illustrated. In order to facilitate the explanation of the sequence, symbols ① through ⑨ and ①' through ④' are used to identify each of the first and second scanning lines. Conventionally, each of the first scanning lines 195 is formed in a successive sequence whereby each of the lines ①, ②, ③, ④, ⑤, ⑥, ⑦, ⑧ and ⑨ follows one after another. Each of the second scanning lines 196 is also formed in such a successive sequence whereby each of the lines ①', ②', ③' and ④' follows one after another. However, it is not possible for either of the first or second scanning lines to traverse the entire area of said bar-code within a short time, and accordingly, it takes a much longer time to complete the scanning of said bar-code.

A preferable sequence according to the experiment is the following: ①, ④, ⑦, ②, ⑤, ⑧, ③, ⑥ and ⑨ and ①', ③', ②' and ④'. The first and second scanning lines are formed on every other line or every other two lines. In this sequence, it is quite possible for either of the first or second scanning lines to traverse the entire area of said bar-code in a short time.

The light scanning apparatus for reading said bar-code has to include a photo-sensor such as is represented by numeral 108 in FIGS. 9, 10 or 11. Since the photo-sensor 108 is usually directed toward an illuminated room, external light noise is often applied to the photo-sensor in addition to the reflected scanning laser beam from the bar-code label. Accordingly, it is difficult for a slicer which provides a predetermined threshold level of voltage to produce output "0" level pulses or "1" level pulses without errors in accordance with changes in the intensity of the reflected scanning laser beam.

The above-mentioned difficulty can be prevented by utilizing elements and electric circuits mentioned hereinafter by referring to FIGS. 20, 21, 22 and 23. FIG. 20 is a block diagram showing two components of the present invention, one being a light scanning apparatus for reading a bar-code, and the other, a control apparatus which controls said slicer so that said slicer may provide a train of electric pulses without errors in accordance with changes in the intensity of the scanning laser beam reflected from the bar-code. In FIG. 20, a light scanning apparatus 220 is comprised of a laser source 221, a mirror 224, a convex lens 225, a circular disk 222 and a sub-photosensor 228. Number 211 shows a main photo-sensor. A scanning laser beam 223 illuminates each of the holograms (not shown) provided on the disk 222. The beam 223 which has been transmitted through the hologram converges at a transparent window 201, forms a plurality of scanning lines and makes a scanning pattern exhibiting, for example, a lattice mode. The scanning laser beam from the bar-code (not shown) is reflected to the photo-sensor 211 and is then converted into an electric pulse signal $S_1$ therein. FIG. 21 is a perspective view of the light scanning apparatus 220 shown in FIG. 20. In FIG. 21 symbols $a_1$, $a_2$, $a_3$ ... $a_{n-2}$ and $a_c$ represent holograms which form a scanning pattern exhibiting a lattice mode. Reference numeral 202 represents a randomly reflecting plate. The housing around the window 201 and the plate 202 is painted in black, by which the scanning laser beam is absorbed. A shading $a_b$ which darkens the laser beam 223, is arranged between the holograms $a_c$ and $a_{n-2}$. Consequently, when the disk 222 makes one rotation, a period $T_g$ in which the reflected laser beam from the bar-code together with external light noise are applied to the photo-sensor 211, a period $T_o$ in which only external light noise is applied to the photo-sensor 221 by darkening the scanning laser beam 223 by the shading $a_b$, and a period $T_g$ in which the scanning laser beam is converged to the randomly reflecting plate 202 by the hologram $a_c$, are obtained. The period $T_g$ is a period for gain control, as mentioned hereinafter. As shown in FIG. 22, each of the areas which are sandwiched between each pair of holograms $a_c$ and $a_1$, $a_1$ and $a_2$, $a_2$ and $a_3$ ... $a_{n-3}$ and $a_{n-2}$, is painted in black. While, each of the areas which are sandwiched between the hologram $a_{n-2}$ and the shading $a_b$ and between the shading $a_b$ and the hologram $a_c$ is provided with reflecting zones 226 and 227, respectively. When the scanning laser beam 223 shown in FIGS. 20 and 21, is directed to the reflecting zone 226 and 227 (both shown in FIG. 22), each of the reflected laser beams (not shown) is applied to the photo-sensor 228. The output $S_2$ (shown in FIG. 23) from the photo-sensor 228 provides timing pulses. By counting the number of timing pulses, it is possible to detect the area on the disk 222 wherein the scanning laser beam is being illuminated at the moment. Returning to FIG. 20, the control apparatus 210 is comprised of members 212, 230, 240 and 260. Number 230 represents an apparatus for extracting only the electric pulse signal from the electric pulse signal $S_1$ which is generated by both the reflected scanning laser beam reflected from the bar-code and the external light noise. Number 240 represents an apparatus for amplifying the output signal $S_3$ from the apparatus 230. Number 260 represents an apparatus for attenuating a level of the output signal $S_4$ to a predetermined level and, thereafter, providing the attenuated signal to a slicer 250. In other words, the apparatus 260 is a variable attenuator. The output signal $S_2$ is applied to a timing pulse generator 212. In turn, the generator 212 provides a gating signal $S_5$ during the period $T_o$ and a gating signal $S_6$ during the period $T_g$. These signals $S_5$ and $S_6$ are produced by triggering single square pulse generators (not shown). The gating signal $S_5$ is applied to a gate circuit 231 and the gating signal $S_6$ is applied to both AND gates 261 and 262. The apparatus 230 is for extracting only the electric pulse signal from the electric pulse signal $S_1$ which is generated by both the laser beam reflected from the bar-code and the external light noise. The apparatus 230 has a sample-hold circuit 234 which is comprised of the gate circuit 231 which is closed only when the gating signal $S_5$ is applied thereto, a capacitor 232, and an inverting amplifier 233. The apparatus 230 also has an adder 235. The electric pulse signal $S_1$ which is produced during the period $T_o$ and, accordingly, is generated only by the external light noise, is charged in the capacitor 232. The voltage $E_c$ across the capacitor 232 is provided to the inverting amplifier 233 whereby the amplifier 233 provides an inverted voltage $-E_c$. In the adder 235, the inverted voltage $-E_c$ is added to the electric pulse signal $S_1$ which is produced during the period $T_g$. Subsequently, the adder 235 provides an output signal $S_3$ which includes no electric pulse signals generated by the external light noise. The variable attenuator 260 is comprised of an attenuating unit 263 comprised of resistors $R_1$ through $R_8$ and transistors $Q_1$ through $Q_4$, a reversible counter 264 which controls the attenuation level of the attenuating unit 263, and a comparator 265. Symbols $A_1$ and $A_2$ represent buffer amplifiers. The outputs from the AND gates 261 and 262 are, respectively, applied to a up-counting terminal $264_a$ and a down-counting terminal $264_b$ both of the reversible counter 264. A clock pulse CPL provided from a clock pulse generator 266 is applied to each of first inputs of the AND gates 261 and 262. The gating signal $S_6$ is applied to each of second inputs of the gates 261 and 262. The output from the comparator is applied directly to a third input of the gate 262 and indirectly to a third input of the gate 261 through an invertor 267. The comparator compares a level of reference voltage $V_0$ with a level of the output voltage $V_1$ maintained by the attenuating unit 263.

When the voltage level $V_1$ is equal to or higher than the voltage level $V_0$, the comparator 265 produces an output of "0" pulses. However, when the voltage level $V_1$ is lower than the voltage level $V_0$, said comparator 265 then produces an output of "1" pulses. Therefore, when a "1" pulse of the gating signal $S_6$ is being applied to each of the second inputs of the AND gates 261 and 262 during the period $T_g$, the reversible counter 264 operates in such a way that the voltage level $V_1$ may finally become equal to the voltage level $V_0$.

Referring to FIGS. 20 through 23, in the light scanning apparatus 220, after the scanning laser beam 223 has finished illuminating all the holograms $a_1$ through $a_{n-2}$ (see FIG. 22) one after another during rotation of disk 222, the beam 223 illuminates the reflecting zone 226 (FIG. 22) and then the reflected beam is applied to the photo-sensor 228, thereby providing a pulse $P_1$ to said photo-sensor 228. The pulse $P_1$ is shown in FIG. 23(a). FIGS. 23(a), (b) and (c) are the timing charts for explaining the operation of the control apparatus 210 (FIG. 20). The pulse $P_1$ is applied to the timing pulse generator 212 (FIG. 20), and then, the gating signal $S_5$ (FIG. 20) provided therefrom is applied to the gate circuit 231 (FIG. 20). At the same time when the gate circuit 231 remains closed, the electric pulse signal $S_1$ is sampled and held by the sample-hold circuit 234 (FIG. 20). At this moment, since the scanning laser beam 223 (FIG. 21) is darkened by the shading $a_b$ (FIGS. 21 and 22), the charging voltage $E_c$ (FIG. 20) across the capacitor 232 is then proportional to the signal $S_1$ generated only by the external light noise. The charging voltage $E_c$ is held in the same way as it was held during the period $T_o$ (FIG. 23(a)). When the beam 223 illuminates the reflecting zone 227 (FIG. 22) and the reflected beam is applied to the photo-sensor 228, the photo-sensor 228 provides a pulse $P_2$ (FIG. 23(a)), thereby applying the gating signal $S_6$ to each of the second inputs of the AND gates 261 and 262. At the moment when the gating signal $S_6$ is provided, the scanning laser beam 223 is converged on the randomly reflecting plate 202 (FIGS. 20 and 21) through the hologram $a_c$ (FIGS. 21 and 22). Accordingly, both the external light noise and the reflected beam from the randomly reflecting plate 202 are applied to the main photo-sensor 211 (shown in FIG. 20). It should be noted that the quantity of light reflected by the randomly reflecting plate 202 is selected to be equal to the average quantity of light reflected by an object to be scanned, that is, the bar-code. The electric pulse signal $S_1$ which is generated by both the reflected beam from the randomly reflecting plate 202 and the external light noise, is applied to one input of the adder 235. Since the electric pulse signal $S_1$ which is generated only by the external light noise during the period $T_o$, is applied to the other input of the adder 235 through the inverting amplifier 233, the output signal $S_3$ corresponds to the electric pulse signal which is proportional only to the beam reflected from the randomly reflecting plate 202. Thus, the output signal $S_3$ forms a train of electric pulses similar to that of the electric pulse signal $S_1$ generated only by the reflected beam from the plate 202. The output signal $S_3$ is amplified by the amplifier 240 and further attenuated to the voltage level $V_1$ by the attenuating unit 263. If the voltage level $V_1$ is not equal to the reference voltage level $V_0$, then the reversible counter 264 controls the attenuating unit 263 until the voltage level $V_1$ becomes equal to the reference voltage level $V_0$. The reference voltage level $V_0$ is selected in accordance with a tolerance level of input voltage of the slicer 250. During the period time when the scanning laser beam 223 is illuminating the holograms $a_1$ through $a_{n-2}$, successively one after another, the gating signal $S_6$ is "0" pulse, and thereby, the reversible counter 264 stops counting the number of pulses provided from the AND gates 261 or 262. Therefore, the attenuation level of the attenuating unit 263 is held at an optimum level which is set once at every single rotation of the disk 222. Thus, although the photo-sensor 211 receives both the laser beam reflected from the bar-code and the external light noise, the electric pulse signal, which is equivalent to the signal generated only by the beam reflected from the bar-code and not by the external light noise, is obtained by utilizing the apparatus 230. Furthermore, the level of the electric pulse signal without including the signal generated by the external light noise, is made optimum for the slicer 250 by the variable attenuator 260. The control apparatus is useful for compensating not only the above-mentioned external light noise but also the gradually lowering of intensity of the laser beam which help to maintain a condition of stability in the long run.

What is claimed is:

1. A light scanning apparatus comprising:
   a circular disk having a plurality of first zone-type lenses and a plurality of second zone-type lenses, each of the first zone-type lenses converging a first incoming light beam toward a corresponding first focal point and each of the second zone-type lenses converging a second incoming light beam toward a corresponding second focal point,
   light beam source means for providing both said first light beam and said second light beam, and for directing said first light beam and said second light beam, respectively, onto points different from each other on said circular disk so that said first and second light beams illuminate said first and second zone-type lenses, respectively, and
   motive means for providing relative motion between said light beam and both said first and second zone-type lenses, respectively, whereby each of said corresponding converged light beams scans an object to be scanned in a first scanning direction and in a second scanning direction, respectively, said second scanning direction intersecting the first scanning direction.

2. A light scanning apparatus as set forth in claim 1, wherein said first incoming light beam directly scans the object in said first direction, said apparatus including a Dove prism, said second incoming light beam being first converged onto and transmitted through the Dove prism, and then, said transmitted light provided by the Dove prism scanning the object in said second scanning direction.

3. A light scanning apparatus as set forth in claim 1, wherein said circular disk is made of transparent glass and includes a photosensitive layer coated on its surface, and wherein each of said first zone-type lenses is formed in a first corresponding area of said photosensitive layer by illuminating both a parallel plane wave of laser beam and a spherical wave of laser beam onto said photosensitive layer, said circular disk being rotated a step at a time in a first direction and at the same time the focal point of said spherical wave is moved a step at a time in said first direction; while each of said second zone-type lenses is formed in a second corresponding area of said photosensitive layer by illuminating both a parallel plane wave of laser beam and a spherical wave of laser beam onto said photosensitive layer, said circular disk being rotated a step at a time in a second direction and at the same time the focal point of said spherical wave is moved a step at a time in said second direction.

4. A light scanning apparatus as set forth in claim 1, including a first lens located between said circular disk and said source for transforming said light beam into a diverging beam.

5. A light scanning apparatus as set forth in claim 4, further comprising a second lens located between said first lens and said light beam source for converging said light beam.

6. A light scanning apparatus as set forth in claim 1, wherein first scanning lines are formed on the object and arranged with an orientation perpendicular to said first scanning direction and second scanning lines are formed on the object and arranged with an orientation perpendicular to said second scanning direction, said first and second zone-type lenses being so arranged on said circular disk and so arranged as to respective focal points so that each of said first and second scanning lines is respectively scanned by each of said corresponding converged light beams.

7. A light scanning apparatus as set forth in claim 1, wherein at least one of said first and second zone-type lenses is replaced by a shading which darkens said light beam, whereby the level of an external light noise usually included in a light beam reflected from an object is detected every time said light beam coincides with said shading.

8. A light scanning apparatus as set forth in claim 1, wherein said first and second zone-type lenses are disposed in such a relationship therebetween that, during the time when any one of said first zone-type lenses is being illuminated by said first light beam, none of said second zone-type lenses is being illuminated by said second light beam, and when any one of said second zone-type lenses is being illuminated by said second light beam, none of said first zone-type lenses is being illuminated by said first light beam.

9. A light scanning apparatus as set forth in claim 1, wherein said first light beam and said second light beam are produced by optically separating a single light beam into two different light beams.

10. A light scanning apparatus as set forth in claim 1, wherein a first point onto which said first light beam is directed and a second point onto which said second light beam is directed are arranged on said circular disk with an angle of 90° between them with respect to the central point of said circular disk.

11. A light scanning apparatus as set forth in claim 10, wherein said first and second zone-type lenses are disposed in such a relationship therebetween that during the time when any one of said first zone-type lenses is being illuminated by said first light, beam, none of said second zone-type lenses is being illuminated by said second light beam, and during the time when any one of said second zone-type lenses is being illuminated by said second light beam, none of said first zone-type lenses is being illuminated by said first light beam.

12. A light scanning apparatus as set forth in claim 1, including a first lens located between said circular disk and said source for transforming said light beam into a converging beam.

13. A light scanning apparatus as set forth in claim 12, further comprising a second lens located between said first lens and said light beam source for diverging said light beam.

14. A light scanning apparatus comprising:
a circular disk having a plurality of first zone-type lenses and a plurality of second zone-type lenses, each of the first zone-type lenses converging a first incoming light beam toward a corresponding first focal point and each of the second zone-type lenses converging a second incoming light beam toward a corresponding second focal point, and
motive means for providing relative motion between said light beam and both said first and second zone-type lenses, respectively, whereby each of said corresponding converged light beams scans an object to be scanned in a first scanning direction and in a second scanning direction, respectively, said second scanning direction intersecting the first scanning direction, wherein said circular disk rotates in a rotational plane, and including means for providing a single light beam and means for separating said single light beam into said first incoming light beam, which fixedly illuminates a first point in said rotational plane, and into said second light beam, which fixedly illuminates a second point in said rotational plane, so that when each of said first zone-type lenses intersects with said first light beam at said first point and when each of said second zone-type lenses intersects with said second light beam at said second point, each of the corresponding converging light beams scans the object in said first and second scanning directions, respectively.

15. A light scanning apparatus comprising:
a first circular disk having both first zone-type lenses and first through-holes, and
a second circular disk having both second zone-type lenses and second through-holes, and wherein said second circular disk is rotatably located slightly above the first circular disk said apparatus further including means for rotating said second circular disk in synchronism with said first circular disk, and wherein said first and second circular disks are further arranged in such relation that, during said rotation, any one of said first zone-type lenses coincides with any one of said second through-holes at a point where a light beam is illuminated, and any one of said second zone-type lenses coincides with any one of said first through-holes at said point.

16. A light scanning apparatus as set forth in claim 15, wherein said circular disks have a gap distance between them, and said first and second zone-type lenses have respective focal lengths so that said focal length of each of said second zone-type lenses is different from said focal length of each of said second zone-type, said respective focal lengths being related in accordance with the gap distance between said first and second circular disks.

17. A light scanning apparatus comprising:
a circular disk having a plurality of first zone-type lenses and a plurality of second zone-type lenses, each of the first zone-type lenses converging a first incoming light beam toward a corresponding first focal point and each of the second zone-type lenses converging a second incoming light beam toward a corresponding second focal point, and
motive means for providing relative motion between said light beam and both said first and second zone-type lenses, respectively, whereby each of said corresponding converged light beams scans an object to be scanned in a first scanning direction and in a second scanning direction, respectively, said second scanning direction intersecting the first scanning direction, including a reflecting plate located adjacent to said object to be scanned and having a predetermined reflectivity to be utilized as a reference for measuring and compensating for variations in the reflective intensity of said light beam reflected from said object being scanned, wherein at least one of said first and second zone-type lenses is replaced by a third zone-type lens which converges said light beam onto said reflecting plate utilized for reference, said apparatus including first means for monitoring said light beam reflected from said object being scanned, second means for monitoring the intensity of the reflected beam from said reflecting plate utilized for reference, and further means responsive to said first and second means for compensating for gradual changes in the level of intensity of said light beam reflected from said object being scanned.

18. A light scanning apparatus for scanning an object to be scanned, comprising:
a circular disk having both first zone-type lenses and second zone-type lenses, the direction of diffraction of each of said first zone-type lenses being different from the direction of diffraction of each of said second zone-type lenses;
a light beam source for providing and directing a fixed light beam onto a fixed region defined by said first and second zone-type lenses;
optical means for skewing the direction of said light beam transmitted through each of said first zone-type lenses; and
motive means for rotating said circular disk so as to cause the light beam transmitted through said optical means to scan said object to be scanned in a first scanning direction, and to cause the light beam transmitted through each of said second zone-type lenses to scan said object to be scanned in a second scanning direction intersecting with said first scanning direction.

19. A light scanning apparatus for scanning an object to be scanned, comprising:
a circular disk having both first zone-type lenses and second zone-type lenses, the direction of diffraction of each of said first zone-type lenses being different from the direction of diffraction of each of said second zone-type lenses;
a light beam source for providing and directing a fixed light beam onto a fixed region defined by said first and second zone-type lenses;
optical means for skewing the direction of said light beam transmitted through each of said first zone-type lenses; and
motive means for rotating said circular disk so as to cause the light beam transmitted through said optical means to scan said object to be scanned in a first scanning direction, and to cause the light beam transmitted through each of said second zone-type lenses to scan said object to be scanned in a second scanning direction intersecting with said first scanning direction,
wherein both said first and second zone-type lenses are arranged along the same circular locus located on said circular disk.

20. A light scanning system comprising:
a light scanning apparatus for scanning an object to be scanned, said light scanning apparatus comprising
a circular disk having a plurality of zone-type lenses and a shaded area provided between a given two of said zone-type lenses,
a light beam source providing a light beam, and
motive means for moving said light beam and said circular disk relative to each other so as to cause said light beam to be directed sequentially onto each of said zone-type lenses and said shaded area, whereby said light beam is transmitted through each respective one of said zone-type lenses to scan said object to be scanned in a respective scanning direction when said light beam is not illuminating said shaded area; and
an optical reader comprising photosensor means located between said object and said zone-type lenses for monitoring external light noises received from an area adjacent to said object during the time when said light beam is illuminating said shaded area, said shaded area being subsequently replaced by one of said zone-type lenses so as to converge said scanning light beam to said photosensor.

21. A light scanning system as set forth in claim 20, wherein said object is a bar-code label.

22. A light scanning system for scanning an object to be scanned, comprising:
a reflecting plate disposed adjacent to said object to be scanned;
a light scanning apparatus which comprises
a circular disk having at least a plurality of zone-type lenses,
a light beam source providing a light beam directed sequentially onto each of said zone-type lenses and onto said reflecting plate, and
motive means for moving said light beam and said circular disk relative to each other so as to cause said light beam transmitted through each respective one of said zone-type lenses to scan said object to be scanned in a respective scanning direction; and an optical reader which includes a photosensor located between said object and said zone-type lenses for receiving the light beam reflected from said reflecting plate located adjacent to said object, comparing means for comparing the level of the output signal produced by said photosensor and a predetermined reference level, and compensating means for compensating the level of the light beam reflected from said object in accordance with the resultant signal produced by said comparing means.

23. An optical reader as set forth in claim 22, wherein said object is a bar-code label.

24. A light scanning system for scanning an object to be scanned, comprising:

a light scanning apparatus comprising a circular disk having a plurality of zone-type lenses and a shading provided between a given two of said zone-type lenses, a light beam source providing a light beam directed sequentially onto each of said zone-type lenses and onto said shading, and motive means for moving said light beam and said circular disk relative to each other so as to cause said light beam transmitted through each respective one of said zone-type lenses to scan said object to be scanned in a respective scanning direction; and an optical reader which includes photosensor means located between said object and said zone-type lenses for monitoring external light noises received from an area adjacent to said object during the time when said light beam is illuminating said shading and producing a first signal in accordance therewith, said shading being subsequently replaced by one of said zone-type lenses so as to converge said scanning light beam onto said object and cause said photosensor to produce a second signal in accordance therewith, and means for producing a difference signal between said first signal and said second signal, said optical reader utilizing said difference signal to read signals which are created by the light beam reflected from said object without including said external light noises.

25. A light scanning apparatus for scanning an object to be scanned, comprising:

a light source for providing a light beam;

a stationary circular disk having a plurality of sets of different type zone-type lenses arranged to define a circular locus, each set of different type zone-type lenses having a respective diffraction to produce a corresponding scan line of different respective corresponding orientation;

a rotatable circular disk between said light source and said stationary circular disk, and having an optical means for directing said light beam toward said circular locus defined by said zone-type lenses; and motive means for rotating said rotatable circular disk so as to cause said light beam to illuminate sequentially each of said different type zone-type lenses on said stationary circular disk, said light beam being sequentially transmitted through each respective one of said different type zone-type lenses so as to scan said object to be scanned in a respective scan line of different respective corresponding orientation.

26. A light scanning apparatus as set forth in claim 25, wherein said optical means is a diffracting element mounted on the center of said rotatable circular disk, onto which diffracting element said light beam is directed.

27. A light scanning apparatus for use in a bar-code label reader for scanning a bar-code label, said apparatus comprising:

a circular disk having both first zone-type lenses and second zone-type lenses, the direction of diffraction of each of said first zone-type lenses being different from the direction of diffraction of each of said second zone-type lenses;

a light beam source for providing and directing a fixed light beam onto a fixed region defined by said first and second zone-type lenses;

optical means for skewing the direction of said light beam transmitted through each of said first zone-type lenses; and motive means for rotating said circular disk so as to cause the light beam transmitted through said optical means to scan said bar-code label in a first scanning direction, and to cause the light beam transmitted to each of said second zone-type lenses to scan said bar-code label in a second scanning direction intersecting with said first scanning direction, whereby said light scanning apparatus is able to read said bar-code label without regard to the direction in which said bar-code label is oriented;

wherein both said first and second zone-type lenses are arranged along the same circular locus located on said circular disk.

* * * * *